US009061453B2

(12) United States Patent
Taylor et al.

(10) Patent No.: US 9,061,453 B2
(45) Date of Patent: Jun. 23, 2015

(54) PROTECTIVE GARMENTS AND MATERIALS THEREFOR

(75) Inventors: John A. Taylor, Shropshire (GB); Agampodi Sunsil Shantha Mendis, Gampaha (LK); Mohammed Fazal Abdeen, Colombo (LK); Howard W. T. Goth, West Yorkshire (GB)

(73) Assignee: ATG Ceylon (Private) Limited, Katunayake (LK)

( * ) Notice: Subject to any disclaimer, the term of this patent is extended or adjusted under 35 U.S.C. 154(b) by 776 days.

(21) Appl. No.: 12/914,510

(22) Filed: Oct. 28, 2010

(65) Prior Publication Data

US 2011/0099689 A1     May 5, 2011

(30) Foreign Application Priority Data

Nov. 2, 2009 (GB) .................................. 0919143.8
Jan. 13, 2010 (GB) .................................. 1000489.3

(51) Int. Cl.
| | |
|---|---|
| *B29C 41/14* | (2006.01) |
| *A41D 19/00* | (2006.01) |
| *B32B 25/02* | (2006.01) |
| *B29C 41/20* | (2006.01) |
| *B29C 41/22* | (2006.01) |

(Continued)

(52) U.S. Cl.
CPC ................ *B29C 41/14* (2013.01); *B32B 25/02* (2013.01); *A41D 19/0065* (2013.01); *B29C 41/20* (2013.01); *B29C 41/22* (2013.01); *B29K 2105/045* (2013.01); *B29K 2105/0836* (2013.01); *B29K 2105/12* (2013.01); *B29L 2009/00* (2013.01); *B29L 2031/4864* (2013.01); *D06N 3/0043* (2013.01); *D06N 3/0056* (2013.01); *D06N 3/0061* (2013.01); *D06N 3/183* (2013.01); *D06N 2205/14* (2013.01); *D06N 2205/24* (2013.01); *D06N 2211/103* (2013.01)

(58) Field of Classification Search
CPC ........ B29C 41/14; B29C 41/20; B29C 41/22; B29K 2105/0836; B29L 2031/4864; A41D 19/0065; B32B 25/02
USPC ........ 427/243–246, 389.9, 412, 430.1; 2/159, 2/161.6–161.8, 164, 167–169
See application file for complete search history.

(56) References Cited

U.S. PATENT DOCUMENTS 2,120,722 A * 6/1938 Tillotson ....................... 427/261
4,172,293 A    10/1979 Vistins (Continued)

FOREIGN PATENT DOCUMENTS

| GB | 2074085 A | 10/1981 |
|---|---|---|
| GB | 2186183 A | 8/1987 |

(Continued)

OTHER PUBLICATIONS

Search Report for Application No. GB0919143.8.

(Continued)

*Primary Examiner* — Michael Tolin
(74) *Attorney, Agent, or Firm* — Wegman, Hessler & Vanderburg

(57) ABSTRACT

A method of making a garment material, comprising: providing a substrate formed of yarn, the substrate having interstices through it; applying a polymeric material to the substrate, the polymeric material having fibers suspended in it; coagulating at least some of the polymeric material onto the substrate to form a composite layer of the polymeric material and the fibers.

7 Claims, 5 Drawing Sheets

(51) Int. Cl.
    *D06N 3/00*           (2006.01)
    *D06N 3/18*           (2006.01)
    *B29K 105/04*        (2006.01)
    *B29K 105/08*        (2006.01)
    *B29K 105/12*        (2006.01)
    *B29L 9/00*           (2006.01)
    *B29L 31/48*          (2006.01)

(56) References Cited

U.S. PATENT DOCUMENTS

| | | | |
|---|---|---|---|
| 4,526,828 A | 7/1985 | Fogt et al. | |
| 6,021,524 A * | 2/2000 | Wu et al. | 2/167 |
| 6,962,064 B1 | 11/2005 | Hardee | |
| 7,037,579 B2 | 5/2006 | Hassan et al. | |
| 7,814,571 B2 | 10/2010 | Thompson | |
| 2005/0221073 A1* | 10/2005 | Liou | 428/304.4 |
| 2006/0189240 A1* | 8/2006 | Taylor et al. | 442/320 |
| 2007/0204381 A1 | 9/2007 | Thompson et al. | |
| 2010/0037364 A1* | 2/2010 | Saunders et al. | 2/161.7 |

FOREIGN PATENT DOCUMENTS

| | | |
|---|---|---|
| JP | 2007100283 A | 4/2007 |
| WO | WO2005/068186 A1 | 7/2005 |
| WO | WO 2005/088005 A1 | 9/2005 |
| WO | WO2006/075980 A1 | 7/2006 |
| WO | WO 2008/018335 A1 * | 2/2008 |

OTHER PUBLICATIONS

Search Report for Application No. GB1000489.3.

* cited by examiner

PROTECTIVE GARMENTS AND MATERIALS THEREFOR

CROSS REFERENCE TO RELATED APPLICATION

This application claims the priority benefit of UK Patent Application Serial No. GB0919143.8 filed Nov. 2, 2009 and UK Patent Application Serial No. GB1000489.3 filed Jan. 13, 2010.

FIELD OF THE INVENTION

The present invention relates to polymeric garment material, garments made of such material, and methods of making polymeric garment material.

BACKGROUND TO THE INVENTION

Polymeric materials are currently used for a wide range of garments, some of these garments (for example, raincoats and aprons) make use of the protective properties of the material. When handling hazardous or damaging substances, it is necessary to wear protective gloves. For example, in certain sectors of industry it is necessary for workers to wear heavy duty protective gloves to prevent their hands from being exposed to hazardous chemicals in the form of oils or liquids. Polymeric materials can be used for making such gloves.

It is desirable for a protective glove to be liquid impermeable and resistant to corrosion by chemicals, so as to protect a wearer's hands. However, it is also desirable for such a protective glove to be light-weight and flexible, so as not to hinder the wearer's dexterity, and have an outer surface that provides good traction between the glove and an object to being handled. It would also be desirable to provide a glove which is comfortable, so that a wearer is not inclined to remove the protective gloves in hazardous environments, e.g. by providing improved sweat absorption or dissipation properties.

Gloves with a subset of the above desirable properties are known, but generally known gloves do not exhibit all of these properties, or do not exhibit them to as great a degree as is desirable.

U.S. Pat. No. 7,037,579 B2 relates to method of applying coatings of fibrous polymeric composite to articles such as gloves. However, these gloves provide poor tear resistance.

SUMMARY TO THE INVENTION

According to one aspect of the present invention there is provided a method of making a garment material, comprising: providing a substrate, which may be formed of yarn and may have interstices through it; applying to the substrate a polymeric material and fibres; and coagulating at least some of the polymeric material onto the substrate to form a composite layer of the polymeric material and fibres.

The polymeric material in the composite layer may be foamed, or it may not be e.g. it may be a liquid. An outer layer of the foamed polymeric composite material may be removed while uncoagulated whereby the outer surface of the polymeric layer has an open porous structure.

A second, and optionally further, polymeric layers may be applied over the composite layer. The polymeric material in the second, and further, layers may be non-foamed.

The method may further comprise applying a third layer, which may be an outer layer, of polymeric material over the second layer, which may be non-foamed, the polymeric material in the third layer being foamed.

The third layer of foamed polymeric material may be partially coagulated and an outer part of the third layer may be removed to leave an open porous surface.

The present invention further provides a garment material comprising a substrate formed of yarn and having interstices through it, and a composite layer of polymeric material with fibres suspended in it covering one side of the substrate. The polymeric material may be foamed. The composite layer may have a thickness of from 0.1 to 0.3 mm The lining may have a thickness from 0.3 to 0.5 mm.

The garment material may comprise a second polymeric layer covering the composite layer. The second polymeric layer, which may comprise a continuous single layer or may be made up of a number of sub-layers, may have a thickness of 0.1 to 0.5 mm The garment material may further comprise a third layer of polymeric material, which may form an outer layer, covering the second layer of polymeric material, the polymeric material in third layer being foamed. The third layer of foamed polymeric material may have an open porous surface. The third layer of foamed polymeric material may have a thickness of 0.1 to 0.3 mm.

Preferred embodiments of the present invention will now be described, by way of example only, with reference to the accompanying drawings in which:

BRIEF DESCRIPTION OF THE DRAWINGS

These and other aspects of the invention will be understood from the description and claims herein, taken together with the drawings showing details of construction and illustrative embodiments, wherein:

DESCRIPTION OF THE PREFERRED EMBODIMENTS

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified.

In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 1:
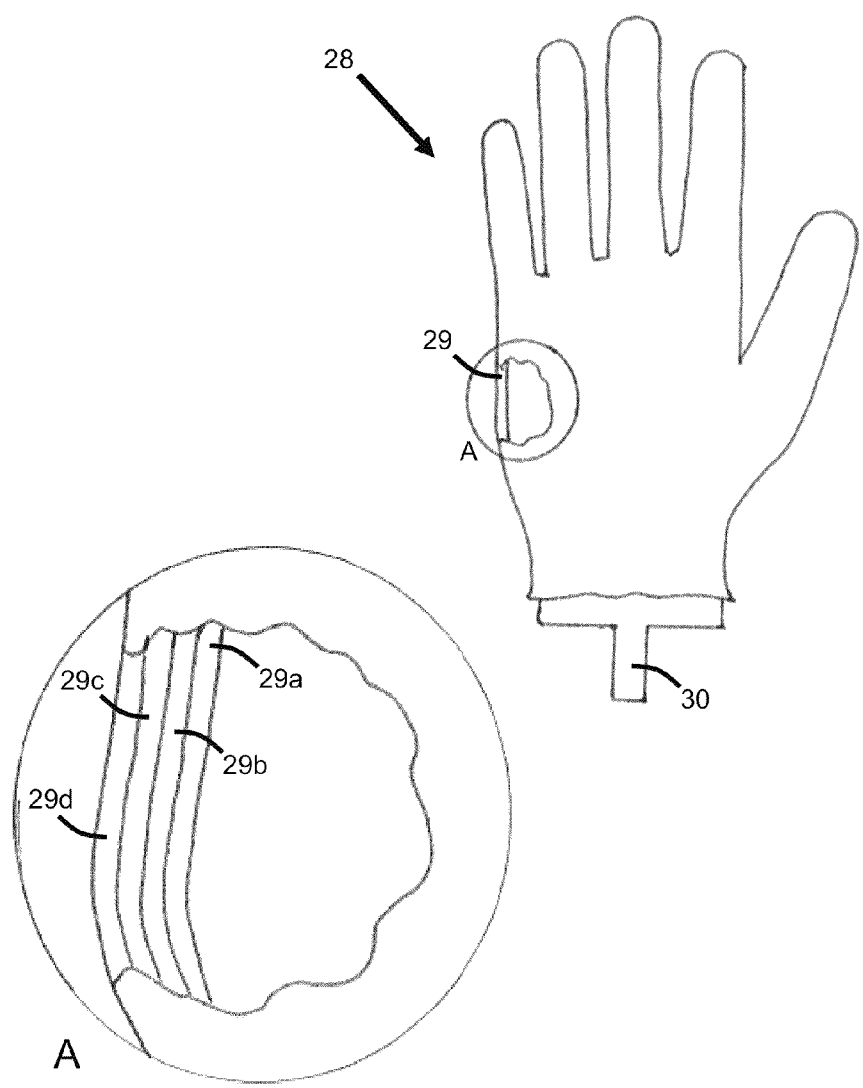
FIG. 1 is a partially cut-away view of a garment according to an embodiment of the invention as formed on a mould.
Figure 2:
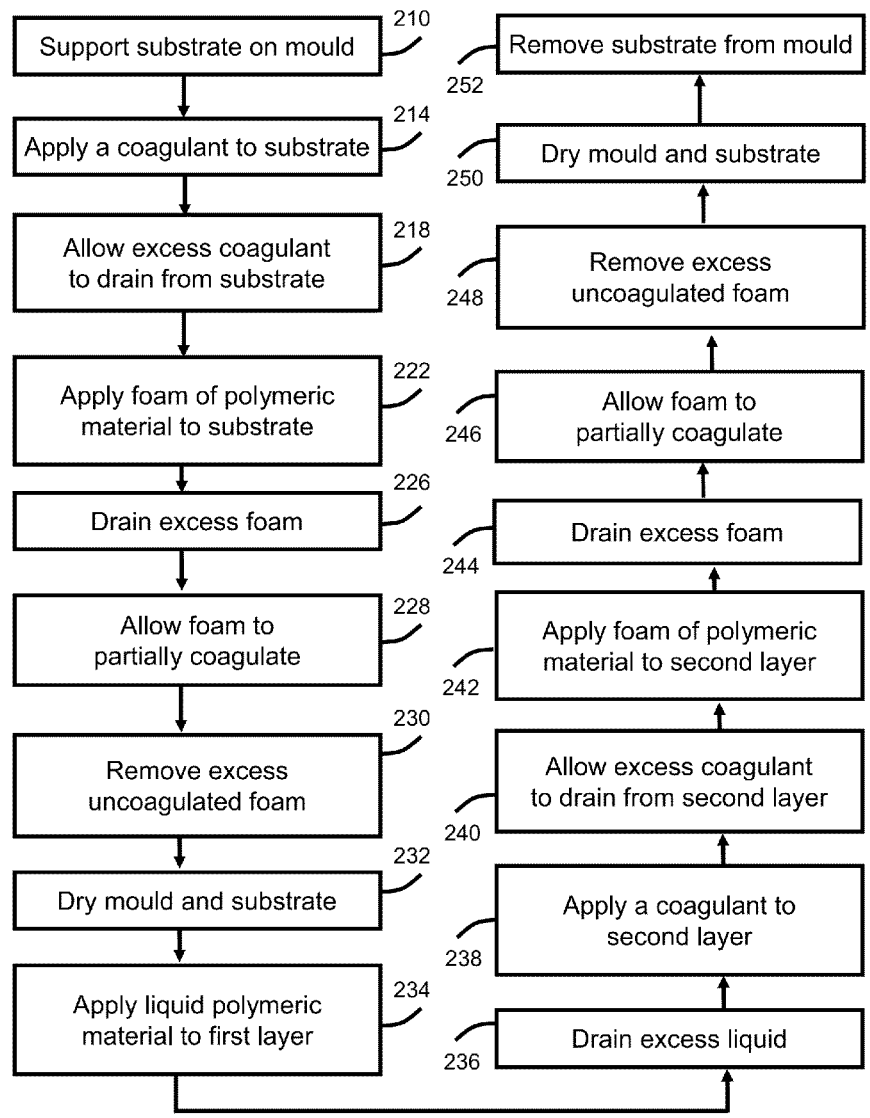
FIG. 2 is a flowchart illustrating a method of making garment material according to an embodiment of the invention.
Figure 3:
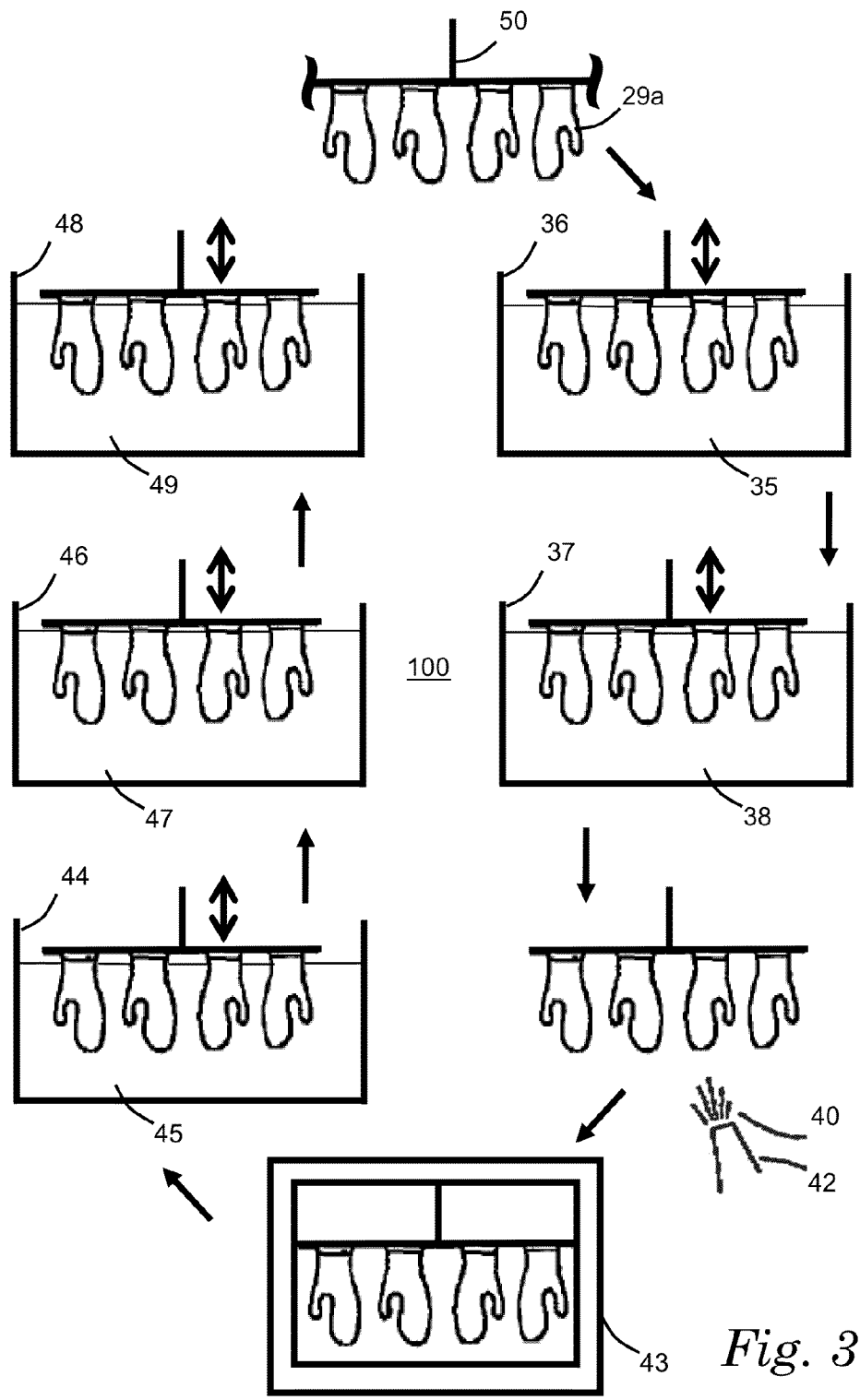
FIG. 3 schematically illustrates a system for making garment material according to an embodiment of the invention.

Referring to FIGS. 1, 2 and 3, to make a garment 28 of garment material 29 according to an embodiment of the invention, at a first step 210 a lining or substrate 29a is fitted to a mould 30. The mould 30 supports the substrate 29a during the various process steps that are applied to the substrate 29a to produce the garment material 29. After the garment material 29 has been made it is removed from the mould 30.

The substrate 29a may be in the form of a complete garment 28, for example, a glove of garment material 29 (as is illustrated in FIG. 1) or in a form that is a section of a garment, for example a pocket for a coat. In such cases the mould 30 provides the correct shape for the finished garment 28 or garment section. When the mould takes the shape of a finished garment 28 it is preferable that the substrate 29a fitted on to the mould 30 is seamless so that the finished garment 28 is also seamless. Alternatively, the mould 30 need not take any particular form and sheets of garment material 29 are formed by the process. For example, the substrate 29a may be stretched out between two clamps or rollers, and for the purpose of this specification the term "mould" covers arrangements of clamps, rollers and the like that support the substrate 29a by applying tension to the substrate 29a. In this case, garment 28 or garment sections are produced by further processing of the sheets of garment material 29 for example by pieces being cut from the sheet of garment material 29 and then the pieces being used to make a garment 28.

The mould 30 may be made from, for example, metal, porcelain, fibreglass or plastic.

The substrate 29a is knitted from a yarn (80 to 160 denier) of nylon (polyamide), using a knitting machine gauge in the preferred range of 13 G to 18 G and most preferably 15 G. Other suitable materials for the substrate 29a include one of, or a blend of two or more of: nylon, cotton, rayon, spandex, lycra, polyester, aramid, dyneema, acrylic, carbon conductive fibre, copper conductive fibre, thunderon conductive fibre, multifilament yarn spun from liquid crystal polymer (available under the brand name Vectran™), tactel, CoolMax™, ThermaStat™, Thermax™ and Viafil®. For example, the substrate could comprise a blend of 95% nylon and 5% lycra. The substrate 29a may also be formed by weaving or some other suitable known process.

Figure 4A:
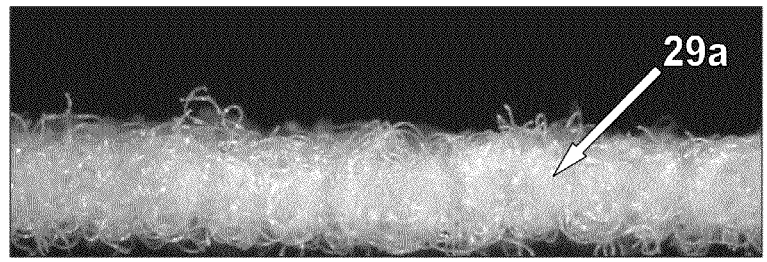
FIG. 4a is a photograph of a knitted lining used in the method of FIG. 2.

These materials form light weight and low denier yarns, resulting in the knitted substrate 29a being able to stretch considerably relative to its original size as knitted. Therefore, the substrate 29a is knitted to a size smaller than is required, e.g. for the garment being made, and smaller than the mould 30 so that it stretches when fitted to the mould 30. This has the effect of producing a substrate 29a with a more open construction relative to the substrate 29a as knitted, i.e. the interstices in the substrate are enlarged, and a lower weight per area of substrate 29a is obtained. The substrate 29a is typically in the range of 60 to 90 grams per square meter, when fitted to the mould 30, with a thickness of around 0.3 to 0.5 mm. An example of the substrate prior to placing on the mould is shown in FIG. 4a.

The process may be applied to batches of substrates ('batch-processing') such that the process steps are applied to a group of moulds 30, each mould 30 supporting a substrate 29a. Alternatively, the process may be applied continuously such that the moulds 30 are continuously translated through the system 100. Of course, the moulds 30 may be continuously translated through some parts of the system 100 and stationary for periods of time at other parts of the system 100 according to what particular process step is occurring at those positions. Referring to FIG. 4, the moulds 30, bearing the substrates 29a are mounted in a row on a bar 50, termed a "flight bar". In the example illustrated, four pairs of moulds 30 (bearing four pairs of gloves 28 respectively) are mounted on a flight bar 50. The flight bar 50 moves in a linear direction from one process station to another at a set speed. Of course, the speed at which the flight bar 50 is set can be varied. There may be several flight bars 50, each flight bar 50 being at a different stage of the process, and the movement of a flight bar 50 from one station to the next is at set intervals.

Referring again to FIGS. 2 and 3, at the next step 214 a first coagulant 35 is applied to the substrate 29a. This is achieved by immersing the substrate 29a (supported on the mould 30) into a bath or trough 36 containing the first coagulant 35, but it may be achieved by spraying the first coagulant 35 onto the substrate 29a. The first coagulant 35 is an aqueous or alcoholic solution of electrolytes. Acetic acid is used as the electrolyte, but other suitable electrolytes include formic acid, acetic acid, calcium nitrate, calcium chloride, zinc chloride or a mixture of two or more of these. Methanol is used to provide the alcoholic solution but other alcohols are also suitable, for example, iso-propyl alcohol and ethanol may also be used. The coagulant strength of the first coagulant 35 is around 5% to 15% by weight.

At step 218 excess first coagulant 35, i.e. first coagulant that is not absorbed by the substrate 29a, is allowed to separate from the substrate, by being allowed to drain and/or evaporate from the substrate 29a. Step 218 involves withdrawal of the mould 30 from the bath/trough 36 and rotation of the mould 30 to drain off and evaporate excess first coagulant 35.

Alternatively, to apply the first coagulant 35 to the substrate 29a, the substrate 29a can be pressed onto a sponge saturated with first coagulant 35. This method reduces the amount of first coagulant 35 picked up by the substrate 29a, avoiding the need to allow much time for excess first coagulant 35 to drain from the substrate 29a and for rotating the mould 30.

At the next step 222 a foam 38 of composite fibrous and polymeric material is applied to the substrate 29a, by immersing the mould 30 supporting the substrate 29a into a bath or trough 37 of the foam 38. The production of a foam 38 of polymeric material is well known to a skilled person. The foam 38 is formed from polyurethane (PU) latex, but may be formed from one of, or combination of, several suitable polymeric materials additionally including, nitrile latex, natural latex, polyvinylchloride (PVC), polyvinylacetate (PVA), neoprene (polychloroprene) and rubber. The foam 38 has a density in the range 15-35%, i.e. there is 15-35% air by volume in the foam, and a viscosity in the range 10-120 poise ($1\text{-}12\ Ns/m^2$). Suspended in the polymeric foam 38 is fibrous material in the form of cotton flock at around 2 to 10 parts per 100 parts polymeric material by volume. The fibres may be cotton, rayon, aramid, polyamide, polyester, carbon, glass, polyacrylonitrile, polypropylene or a suitable combination of these. In this embodiment the fibres are milled cotton flock with a nominal fibre length of 0.25 mm (250 microns) and a width in the approximate range 0.01 mm to 0.02 mm (10-20 microns). The cotton flock has a specific gravity of approximately 1.54 grams/$cm^3$, and tenacity within the approximate range of 1.5 to 2.1 cN/dtex. In a further embodiment the fibres are milled cotton flock with a fibre length in the approximate range 0.01 mm to 0.04 mm (10-40 microns) and a width in the approximate range 0.003 mm to 0.012 mm (3-12 microns). This cotton flock has a specific gravity of approximately 1.54 grams/$cm^3$, and tenacity within the approximate range of 2.5 to 5 cN/dtex.

The foam 38 contains thickeners so that the foam 38 is of the required viscosity. The thickeners are added to the polymeric material when the polymeric material is in liquid form, i.e. before it is aerated. Examples of thickeners include polyvinyl alcohol (0.2-1 parts per 100 parts polymeric material by volume), methyl cellulose (0.2-0.8 parts per 100 parts polymeric material by volume) and polyacrylate (0.2-0.6 parts per 100 parts polymeric material by volume).

The foam 38 also contains stabilisers so that the foam 38 is stable (i.e. does not degrade to a liquid) and curatives that provide the polymeric coating obtained from the foam with mechanical strength so that the coating is resistant to, for example, abrasion, punctures and tearing. The stabilisers and curatives are added to the polymeric material when the polymeric material is in liquid form. Examples of stabilisers include diphenyl guanidine alcohol (with a concentration of about 0 to 0.6 parts per 100 parts polymeric material by volume), lauric acid (with a concentration of about 0 to 0.4 parts per 100 parts polymeric material by volume) and alkali casein (0.3-0.8 parts per 100 parts polymeric material by volume). Examples of curatives include sulphur (0.2-0.5 parts per 100 parts polymeric material by volume), zinc oxide (2-5 parts per 100 parts polymeric material by volume) and ZDC (0.2-0.5 parts per 100 parts polymeric material by volume).

Although the thickeners, stabilisers and curatives are added to the liquid polymeric material before it is aerated, they can also be added after aeration, for example if modification of the foam properties is required (for example by adding more thickener to increase the viscosity of the foam).

Figure 4B:
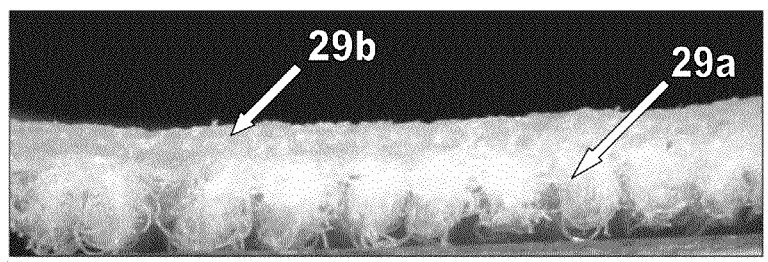
FIG. 4b is a photograph of the lining of FIG. 4 after application of a composite fibrous (and) polymer layer.
Figure 4C:
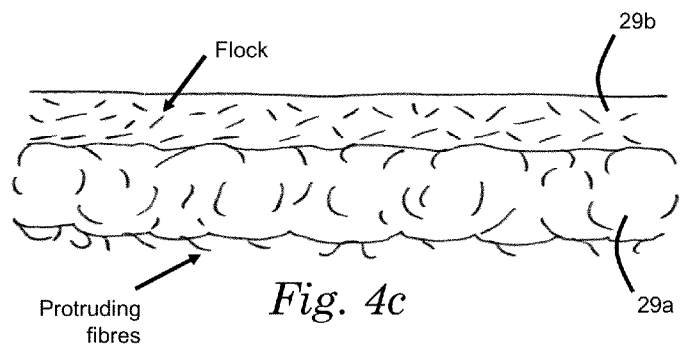
FIG. 4c is a section through the lining and composite layer of FIG. 4b.
Figure 5:
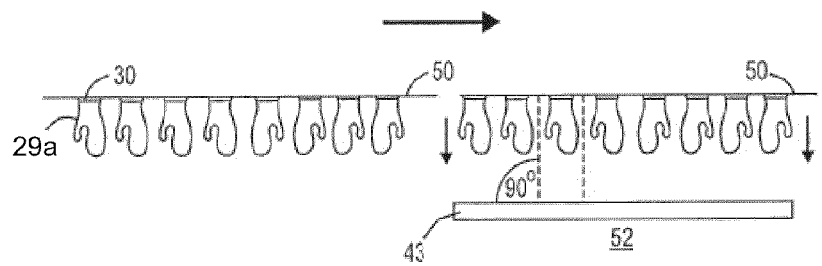
FIG. 5 is side view of the flight bar of the system of FIG. 3, the flight bar being translated into a spraying station.

The penetration of the foam 38 into the substrate 29a is controlled so that the foam 38 does not fully penetrate the substrate 29a. In this way, the garment material produced has an inner surface with no, or very little, exposed polymeric material. This is advantageous since many people have an allergic reaction to polymeric materials (especially latex) worn next to the skin and the non penetrated portion of the substrate 29a would form a barrier between the wearer of the garment and the coating of the polymeric material. Thus the garment 28 will be more comfortable and have better sweat absorption than known garments 28 such as gloves. An example of the substrate 29a and composite layer 29b is shown in FIGS. 4b and 4c.

The flock in the first layer 29b serves to reduce the speed and ease with which the foamed polymeric material penetrates into the substrate 29a. The flock tends to block the interstices in the knitted substrate 29a, which allows for the use of a stretched substrate 29a with enlarged interstices i.e. a thinner and lighter substrate 29a. The substrate 29a is typically in the range of 60 to 90 grams per square meter with a thickness of around 0.3 to 0.5 mm, providing a light weight and breathable garment 28.

At step 226 the mould 30 supporting the substrate 29a is removed from the foam 38 and excess foam is allowed to drain from the substrate 29a to leave a layer of foam 38 on the substrate 29a. The foam 38 is arranged, as described in more detail below, not to pass through the substrate 29a, but to remain on the outer surface or pass part way through the substrate 29a. The foam therefore forms a layer on the outside of the substrate 29a.

The penetration of the foam 38 into the substrate 29a (and the porosity of the foam layer on the substrate 29a) can be controlled by varying a number of parameters including:
  i. the formulation of the fibrous polymeric material;
  ii. the formulation of the first coagulant;
  iii. the time between applying the first coagulant and applying the foam;
  iv. the time between applying the foam and removing excess (uncoagulated) foam;
  v. foam density;
  vi. foam viscosity; and
  vii. the weight and construction of the substrate.

At step 228 the foam 38 reacts with the first coagulant 35 that has been absorbed by the substrate 29a causing coagulation of the foam 38.

Only partial coagulation of the foam 38 is required, therefore, the foam 38 is allowed to react with the first coagulant 35 for a limited period of time. After this period of time the foam 38 closest to the substrate 29a will be coagulated but the degree of coagulation progressively decreases with distance from the substrate 29a so that the outer surface of the foam will not be coagulated (i.e., the outer surface will be wet). Typically the foam 38 is allowed to react with the first coagulant 35 for a period in the range of 60-180 seconds before the excess (uncoagulated) foam 38 is removed. This period is controlled so that the underside of the foam layer that is in contact with the substrate 29a coagulates, but the outer part of the foam layer does not coagulate. Therefore, a film skin is not formed on the outer surface of the foam layer. The partially coagulated foam layer at this stage has a thickness in the range 0.5-1.5 mm, and has suspended in it the cotton flock.

At the next step 230 the outer layer of excess, uncoagulated foam 38 is removed from substantially the whole area of the foam layer on the substrate 29a. This may be done by directing one or more sprays of water 40 at the substrate 29a. The water is directed at the substrate 29a via one or more nozzles 42. Each spray of water 40 has a pressure in the range 1-4 bar ($1\times10^5\text{-}4\times10^5\ N/m^2$). The spraying process lasts for about 5-20 seconds.

The nozzles 42 may be stationary with a set orientation relative to the substrate 29a. Alternatively, the nozzles 42 may be moveable so that the orientation of the nozzle 42 relative to the substrate 29a can be varied during the spraying process. The nozzles 42 may also be translatable relative to substrate 29a during the spraying process to provide good coverage of the substrate 29a with the spray 40. It is also possible to use a continuous jet instead of a spray, however, a spray is preferred since this makes more economical use of water.

Figures 6, 7, 8:
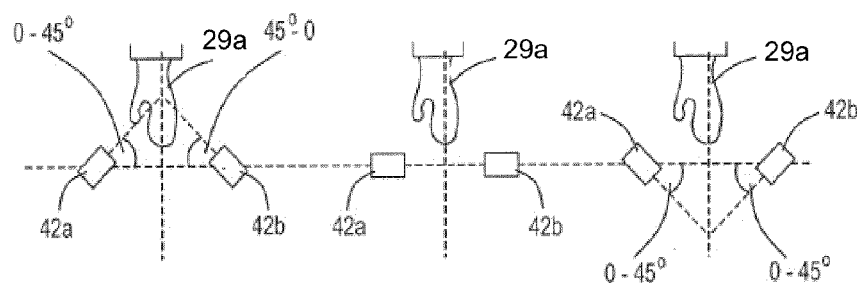
FIG. 6 is a side view of a partially formed garment in a section of the spraying station of FIG. 5 in which nozzles are pointing upwards.
FIG. 7 is a side view of a partially formed garment in a section of the spraying station of FIG. 5, in which nozzles are pointing horizontally.
FIG. 8 is a side view of a partially formed garment in a section of the spraying station of FIG. 5, in which nozzles are pointing downwards.

Referring to FIGS. 5 to 8, according to an embodiment of the invention the moulds 30, bearing the substrates 29a, are translated on a flight bar 50 to a spraying station 52. FIGS. 5 to 8 illustrate the substrate 29a in the form of a glove lining with the fingers of the glove lining pointing downwards (of course the invention is applicable to sock linings and other garment substrates). The spraying station 52 comprises a number of spray nozzles 42. The nozzles form two rows 43 that are orientated so that the nozzles of one row sprays the front of the substrate 29a (e.g. the palm side of the glove linings 29a) whilst the nozzles of the other row spray the back of the substrate 29a (e.g. the backhand side of the glove linings 29a). The nozzles 42 are in a fixed position with a pre-set spraying angle and the nozzles 42 do not move during the spraying process. The spraying angle of each nozzle 42 is in the range 0 to 45° to the horizontal (the horizontal being the normal to the surface of the substrate 29a) and the spraying angle may be adjusted before the spraying process. The nozzles 42 may be arranged as pairs with a nozzle 42a on one row facing a nozzle 42b of the other row. The nozzles 42a, 42b may be set at different angles: for example the pair of nozzles 42a, 42b may point upwards at about 45° to the horizontal as illustrated in FIG. 6; the nozzles 42a, 42b may point horizontally as illustrated in FIG. 7; or the nozzles 42a, 42b may point downwards at 45° to the horizontal illustrated in FIG. 8. It is not necessary for the nozzles 42a, 42b in each pair to be orientated at the same angle to the horizontal.

As water is pumped through the nozzles 42 the flight bar 50 is translated vertically through the spray produced by the nozzles 42. For example, the moulds 30 are first moved downwardly through the sprays and then upwardly through the spray as the moulds are moved through the spraying station on the flight bar 50.

Other fluids could be used to remove the foam 38, for example a jet of compressed air could be directed at the substrate 29a. The foam 38 could also be removed by immersing the substrate 29a in a bath or trough of an aqueous medium. The aqueous medium may comprise an anti-foam agent such as an emulsion of organo-modified polysiloxanes in the concentration range 0.01-0.1% by volume or a blend of petroleum and amorphous silica in the concentration range 0.2-0.8% by volume.

The removal of the excess foam 38, by directing fluid at the substrate 29a, leaves behind a cohesive, porous and breathable layer 29b of composite fibrous and polymeric material, with an open porous surface, on the substrate 29a. At this stage of the process the layer 29b of polymeric material has a thickness in the range 0.1-1.0 mm, and preferably 0.1 to 0.3 mm.

Flock is suspended throughout the foam 38 applied to the substrate, so when the excess, uncoagulated foam 38 is removed some of the flock will be removed and some will be exposed. Parts of some of the exposed flock will protrude from the outer surface of the layer 29b, and some of the exposed flock will be exposed at the outer surface but will not protrude beyond it. Clearly, the protruding parts will not extend to a distance from the substrate that is substantially greater than the thickness of the layer of foam 38 as measured from the substrate to the layer's outer surface. If excess, uncoagulated foam 38 were not removed then some flock would still be exposed at the outer surface of the layer 29b, though typically not extending beyond it.

At the next step 232 the substrate 29a with its layer 29b of fibrous polymeric material is dried for around 20-30 minutes at a temperature of around 50-70 degrees centigrade. The drying may be done in an oven 43 which may be fitted with one or more fans that distribute the heat evenly throughout the oven 43. The drying could also be achieved by directing air over the first layer 29b. The air may be dried and/or heated before it is directed over the first layer 29b.

After being dried, the first layer 29b of fibrous polymeric material consisting of cotton flock suspended in coagulated foam 38 has a thickness in the range 0.1-0.3 mm.

The flock in the first layer 29b of fibrous polymeric material serves to prevent fibres from the yarn of the substrate 29a extending through the first layer 29b, thus preventing or at least reducing the wicking action that would otherwise draw moisture through the first layer 29b and into the substrate 29a along fibres extending through the first layer 29b. Furthermore, this preventative effect of the flock means that a single, thin first layer 29b can be applied, whereas in known garments it would be necessary to apply multiple layers of polymeric material to prevent this wicking action. For example, as can be seen in FIG. 4a, the substrate 29a, prior to application of the composite fibrous and polymeric material will generally have some fibres projecting above the main body of the substrate. The flock in the composite material tends to reduce the height to which these fibres project, in the finished material, as can be seen in FIGS. 4b and 4c, preferably by at least 10% and more preferably by at least 20% from their original height. This results in a reduction in the total thickness of the substrate, as measured between the tops of the projecting fibres on both sides, of at least 5% and preferably at least 10%. This reduces the thickness of the polymeric layer, or layers, that are needed to fully cover the fibres and produce a good liquid-proof material.

At step 234 a second layer 29c of polymeric material is applied to the first layer 29b, for example by immersing the mould 30 supporting the substrate 29a and the first layer 29b of fibrous polymeric material into a bath/trough 44 of liquid polymeric material 45. The liquid polymeric material 45 is formed from polyurethane (PU) latex, but it may be formed from one of, or combination of, several suitable polymeric materials additionally including, nitrile latex, natural latex, polyvinylchloride (PVC), polyvinylacetate (PVA), neoprene (polychloroprene) and rubber. The liquid polymeric material 45 has a viscosity in the range 20-50 poise (2-5 Ns/m$^2$). That is, the viscosity of the liquid polymeric material 45 is much lower than that of the foam 38. During step 234, the mould 30 is immersed in the bath 44 for around 1 to 3 minutes.

Because of the open porous surface of the composite fibrous polymer layer 29b, the polymer layer 29c can penetrate slightly into the fibrous polymer layer which provides a degree of interlocking between the two layers 29b, 29c, which ensures that they are securely held together. In other embodiments the composite fibrous polymer layer 29b can be allowed to coagulate completely so that its surface is less open. Whether or not the composite fibrous polymeric material is foamed, or whether or not it is allowed to coagulate completely, a degree of interlocking is provided by the flock in the fibrous polymer layer 29b. That is, uncoagulated polymeric material from a subsequently-applied layer 29c will in general be absorbed at least a little way into exposed flock from the layer 29b of fibrous polymeric material to which it is applied. When the absorbed polymeric material coagulates it solidifies and anchors the polymeric material from the overlying layer 29c to the flock and thereby to the underlying layer 29b containing the flock. Flock that protrudes from the outer surface of the underlying layer 29b will bridge the two layers 29b, 29c, thereby connecting and holding them securely together. Flock that is exposed at the outer surface of the underlying layer 29b but does not extend beyond it absorbs polymeric material from the overlying layer 29c which thereby penetrates into the underlying layer 29b. This penetration and subsequent coagulation provides a degree of interlocking between the two layers 29b, 29c, which ensures that they are securely held together.

Alternatively, if only a first layer 29b of polymeric material is required, the method of producing a garment 28 or garment material 29 may omit steps 234 to 248 and proceed to step 250.

At the next step 236, the mould 30 is removed from the bath 44, and excess liquid polymeric material 45 is allowed to drain from the first layer 29b. The second layer 29c of polymeric material 45 can be thinner than the first layer 29b of fibrous polymeric material because its lesser viscosity means that more excess material can be drained, leaving a thinner coating of liquid polymeric material 45 on the second layer 29c. Steps 234 and 236 may be repeated if a thicker second layer 29c is desired.

At the next step 238, a second coagulant 47 is applied to the liquid polymeric material 45, for example by immersing the mould 30 into a bath or trough 46 containing the second coagulant 47. The mould 30 and the supported layers 29a, 29b and 29c remain immersed in the bath 46 of second coagulant 47 for several minutes until the polymeric material is fully coagulated. The liquid polymeric material 45 reacts with the second coagulant 47 causing coagulation of the liquid into a second layer 29c of polymeric material. Complete coagulation of the liquid 45 is desired, and the material is therefore held in the second coagulant until the polymeric material 45 is fully coagulated.

At the next step 240, the mould 30 with the supported layers 29a, 29b and 29c is removed from the bath 46 of second coagulant 47 and rotated for 4-5 minutes to drain off and evaporate excess second coagulant 47. As complete coagulation is desired, the second coagulant 47 is not otherwise removed from the surface of the second layer 29c.

Optionally, at a further step 242 a third layer 29d of polymeric material is applied to the second layer 29c, for example by immersing the mould 30 supporting the substrate 29a and the first two layers 29b and 29c into a bath 48 of a second foamed polymeric material 49. The foamed polymeric material 49 is formed from nitrile latex, but it may be formed from one of, or combination of, several suitable polymeric materials additionally including, polyurethane (PU) latex, nitrile latex, natural latex, polyvinylchloride (PVC), polyvinylacetate (PVA), neoprene (polychloroprene) and rubber. The foam 49 has a density in the range 20-40%, i.e. there is 20-40% air by volume in the foam and a viscosity in the range 50-120 poise (5-12 Ns/m$^2$). The mould 30 is immersed in the bath 48 for around 1 to 3 minutes.

At the next step 246 the mould 30 supporting the two layers 29b and 29c of polymeric material is removed from the foam 49, and excess foam is allowed to drain from the second layer 29c.

At step 246 the foam 49 reacts with the second coagulant 45 on the second layer 29c of polymeric material causing coagulation of the foam. Only partial coagulation of the foam 49 is required, therefore, the foam 49 is allowed to react with the second coagulant 47 for a limited period of time. After this period of time the foam closest to the second layer 29c of polymeric material will be coagulated but the degree of coagulation progressively decreases with distance from the second layer 29c so that the outer surface of the foam will not be coagulated (i.e., the outer surface will be wet). Typically the foam 49 is allowed to react with the second coagulant 45 for a period in the range of 30-150 seconds before the excess (un-coagulated) foam 49 is removed. This period is controlled so that the underside of the foam layer that is in contact with the second layer 29c coagulates, but the outer part of the foam layer does not coagulate. Therefore, a film skin is not formed on the outer surface of the foam layer. At this stage, the foam layer has a thickness in the range 0.1 to 1 mm.

At the next step 248 the outer layer of excess, uncoagulated foam 49 is removed from substantially the whole area the layer of foam on the second layer 29c of polymeric material. This may be done using one or more sprays of water as was described above for step 230. In an embodiment of the invention the uncoagulated foam 49 is removed in the same manner as was described above with reference to FIGS. 5 to 8.

At step 250, the mould 30 is rotated for 10-15 minutes to evaporate any surface water. The substrate 29a with its (three) outer layers of polymeric material 29b, 29c and 29d (or with only the first layer 29b if steps 234 to 248 were omitted) is then dried and cured for around 60-90 minutes at a temperature of around 100-140 degrees centigrade. The drying may be done in an oven which may be fitted with one or more fans that distribute the heat evenly throughout the oven. The drying could also be achieved by directing air over the garment 28. The air may be dried and/or heated before it is directed over the garment 28.

After being dried, the first layer 29b of composite fibrous polymeric material consisting of cotton flock suspended in coagulated foam 38 has a thickness in the range 0.1-0.3 mm measured from the top of the flattened lining to the top of the composite layer, the second non-foamed polymeric layer 29c has a thickness in the range 0.1-0.5 mm measured from the top of the foamed composite layer 29b to the top of the second layer 29c, and the third layer has a thickness in the range 0.1-0.3 mm Therefore, the thickness of the garment 28, including the substrate 29a, is in the range 0.6-1.6 mm.

Finally, at step 252 the garment 28, comprising the substrate 29a with the polymeric layers 29b, 29c and 29d, is removed from the mould 30 and washed.

The parameter values disclosed in the description provide fabric material that has the desired properties, however, the skilled person may achieve the advantages of the invention using a method having parameters that vary from those given.

The garment material 29 produced by the invention is particularly suitable for protective gloves. Such gloves 28 need to be substantially liquid impermeable and resistant to chemical corrosion, while also providing the wearer with a high degree of dexterity and, when the gloves 28 are worn for a long period of time, keeping the hands cool, dry and comfortable. Gloves 28 made by the process of the invention allow perspiration to be absorbed by the glove, into the lining 29a and the first foam layer 29b, and the hands of the wearer are not irritated by the glove (either by heat build up, sweat, solvent residue or polymeric material present on the lining of the glove).

Referring to FIGS. 4a, 4b and 4c, the flock in the first layer 29b of polymeric material coats and flattens outwardly-protruding fibres of the yarn in the substrate 29a. In prior art gloves, where liquid proof material is required, such outwardly-protruding fibres have necessitated the use of polymeric layers that are thick enough to prevent the fibres poking through the polymeric layer and drawing liquid into the glove through a wicking action. In gloves 28 made by the process described above however, the thickness of the first layer 29b is reduced because the flock urges the fibres of the substrate down against the substrate 29a so the distance which the fibres extend from the substrate 29a is reduced. That is, by reducing the distance which threads of yarn extend from the substrate 29a, a thinner first layer 29b can be applied without the fibres projecting through to the outer surface of the first layer 29b. The first layer 29b has a thickness in the range 0.1-0.3 mm which leads to increased flexibility, and so allows for better dexterity and usability of the gloves 28.

The flock in the first layer 29b also reduces the speed and ease with which the foamed polymeric material penetrates into the substrate 29a, which allows for the use of a stretched substrate 29a with enlarged interstices i.e. a thinner and lighter substrate 29a. The glove's inner lining 29a is typically in the range of 60 to 90 grams per square meter with a thickness of around 0.3 to 0.5 mm, providing a light weight and breathable glove which absorbs perspiration well.

Although it is envisaged that in embodiments of the invention gloves 28 will comprise the substrate 29a and the first polymeric layer 29b but no further polymeric layers, in other embodiments the gloves 28 may comprise one or both of the two further layers 29c and 29d of polymeric material.

The embodiment described above comprised a first layer 29b of foamed polymeric material that in other embodiments may be replaced by a non-foamed liquid polymeric material that is then partially coagulated in much the same way. That is, though a foamed polymeric material has been described, it should be understood that any suitable liquid (i.e. non-foamed or foamed) polymeric material can be used in the invention. For example, where resistance to chemical corrosion is particularly important it may be advantageous to use a non-foamed polymeric material in the first layer applied to the substrate. This should make it more difficult for chemicals to permeate through that layer. Two or more non-foamed layers could be subsequently added so as to maximise resistance to chemical corrosion. The resulting glove with multiple layers of polymeric material would still be relatively lightweight and have improved sweat absorption compared with the prior art, due to the effects described above of including flock in the first layer.

While this invention has been described in conjunction with the specific embodiments described above, it is evident that many alternatives, combinations, modifications and variations are apparent to those skilled in the art. Accordingly, the preferred embodiments of this invention, as set forth above, are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A method of making a garment material, comprising:
    providing a substrate formed of yarn, the substrate having interstices through it;
    applying a polymeric material to the substrate, the polymeric material having fibers suspended in it, the fibres having a length in the range 0.01 mm to 0.04 mm which block the interstices and prevent the polymeric material fully penetrating the substrate;
    coagulating at least some of the polymeric material onto the substrate to form a composite layer of the polymeric material and the fibers.

2. A method according to claim 1,
    wherein the polymeric material is foamed,
    wherein some of the foamed polymeric material is removed during said coagulating before it coagulates,
    whereby the composite layer has an outer surface comprising an open porous structure.

3. A method according to claim 1 further comprising applying a second polymeric layer over the composite layer.

4. A method according to claim 3 wherein the second polymeric layer comprises non-foamed polymeric material.

5. A method according to claim 3 further comprising applying a third polymeric layer over the second polymeric layer, the third polymeric layer comprising foamed polymeric material.

6. A method according to claim 5,
    further comprising coagulating some of the third polymeric layer and removing some of the third polymeric layer before it coagulates,
    whereby the third layer has an outer surface comprising an open porous structure.

7. A method of making a garment material, comprising:
    providing a substrate formed of yarn, the substrate having interstices through it;
    applying a polymeric material to the substrate, the polymeric material having cotton fibres suspended in it, the fibres having a length in the range 0.01 mm to 0.04 mm which block the interstices and prevent the polymeric material fully penetrating the substrate;
    coagulating at least some of the polymeric material onto the substrate to form a composite layer of the polymeric material and the fibres.

* * * * *